(12) United States Patent
Salman et al.

(10) Patent No.: US 11,934,187 B2
(45) Date of Patent: Mar. 19, 2024

(54) SYSTEMS AND METHODS OF PILOT ASSIST FOR SUBSEA VEHICLES

(71) Applicant: OneSubsea IP UK Limited, London (GB)

(72) Inventors: Nader Salman, Arlington, MA (US); Jack Vincent, Katy, TX (US); Julius Kusuma, Fremont, CA (US)

(73) Assignee: OneSubsea IP UK Limited

( * ) Notice: Subject to any disclaimer, the term of this patent is extended or adjusted under 35 U.S.C. 154(b) by 265 days.

(21) Appl. No.: 16/768,723

(22) PCT Filed: Dec. 3, 2018

(86) PCT No.: PCT/US2018/063634
§ 371 (c)(1),
(2) Date: Jun. 1, 2020

(87) PCT Pub. No.: WO2019/109083
PCT Pub. Date: Jun. 6, 2019

(65) Prior Publication Data
US 2020/0341462 A1 Oct. 29, 2020

Related U.S. Application Data

(60) Provisional application No. 62/593,299, filed on Dec. 1, 2017.

(51) Int. Cl.
*G05D 1/00* (2006.01)
*G05D 1/10* (2006.01)
(Continued)

(52) U.S. Cl.
CPC ......... *G05D 1/0038* (2013.01); *G05D 1/0016* (2013.01); *G05D 1/0022* (2013.01);
(Continued)

(58) Field of Classification Search
CPC .. G05D 1/0022; G05D 1/0016; G05D 1/0088; G05D 1/10; G06N 20/00; G06V 20/20; G06V 20/13; G06K 9/6256
See application file for complete search history.

(56) References Cited

U.S. PATENT DOCUMENTS 5,031,157 A * 7/1991 Anderson ............... G01S 15/42
367/110
5,650,813 A * 7/1997 Gilblom ................. H04N 23/58
348/E7.087

(Continued)

FOREIGN PATENT DOCUMENTS

KR  1020130024077 A   3/2013
KR  1020140139152 A   12/2014

*Primary Examiner* — Fadey S. Jabr
*Assistant Examiner* — Naeem Taslim Alam
(74) *Attorney, Agent, or Firm* — Jeffrey D. Frantz

(57) ABSTRACT

A method for controlling a subsea vehicle. The method includes receiving sensor data representing a subsea environment from one or more sensors of the subsea vehicle. The method identifies one or more objects present in the subsea environment based on the sensor data using an artificial intelligence machine. The method transmits at least a portion of the sensor data, including an identification of the one or more objects, to a user interface. The method includes receiving a requested vehicle task from the user interface. The requested vehicle task being selected by a user via the user interface. The method performs the requested vehicle task without vehicle position control from the user.

20 Claims, 6 Drawing Sheets

(51) Int. Cl.
*G06F 18/214* (2023.01)
*G06N 20/00* (2019.01)
*G06V 20/20* (2022.01)

(52) U.S. Cl.
CPC ............ *G05D 1/0088* (2013.01); *G05D 1/10* (2013.01); *G06F 18/214* (2023.01); *G06N 20/00* (2019.01); *G06V 20/20* (2022.01)

(56) References Cited

U.S. PATENT DOCUMENTS

| | | | | |
|---|---|---|---|---|
| 5,995,882 | A * | 11/1999 | Patterson | B63B 27/36 701/532 |
| 6,260,504 | B1 * | 7/2001 | Moles | B63B 27/36 405/191 |
| 6,266,442 | B1 * | 7/2001 | Laumeyer | G06V 10/443 382/104 |
| 6,731,845 | B1 * | 5/2004 | Gerdt | G02B 23/22 359/402 |
| 8,015,507 | B2 * | 9/2011 | Madsen | G05D 1/0038 715/846 |
| 9,230,302 | B1 * | 1/2016 | Owechko | G06T 1/0007 |
| 9,440,718 | B1 | 9/2016 | Tang | |
| 9,911,059 | B1 * | 3/2018 | Anderson | B64D 47/08 |
| 11,503,251 | B2 * | 11/2022 | Pflug | G06F 3/017 |
| 2002/0083880 | A1 * | 7/2002 | Shelton | H02K 5/1285 114/312 |
| 2005/0265123 | A1 * | 12/2005 | Pope | B63C 11/26 367/99 |
| 2006/0089794 | A1 * | 4/2006 | DePasqua | G01C 21/203 701/532 |
| 2007/0018887 | A1 * | 1/2007 | Feyereisen | G08G 5/0021 342/182 |
| 2007/0297290 | A1 * | 12/2007 | Vosburgh | H04B 13/02 367/131 |
| 2009/0228204 | A1 * | 9/2009 | Zavoli | G01C 21/30 701/532 |
| 2009/0261957 | A1 * | 10/2009 | Kido | B60K 35/00 340/435 |
| 2010/0118147 | A1 * | 5/2010 | Dorneich | H04N 7/185 348/143 |
| 2013/0239869 | A1 * | 9/2013 | Hesse | E02F 3/9243 362/477 |
| 2013/0293364 | A1 * | 11/2013 | Ricci | B60K 35/00 340/425.5 |
| 2013/0325773 | A1 * | 12/2013 | Sinyavskiy | G06N 20/00 706/23 |
| 2014/0165898 | A1 * | 6/2014 | Cierpka | G01S 15/89 114/312 |
| 2014/0285667 | A1 * | 9/2014 | Aimura | G08G 1/16 348/148 |
| 2014/0316611 | A1 * | 10/2014 | Parente Da Silva | G06T 7/70 701/2 |
| 2015/0078123 | A1 * | 3/2015 | Batcheller | G01S 15/86 367/7 |
| 2015/0136012 | A1 * | 5/2015 | Williams | B25J 9/08 901/1 |
| 2015/0177403 | A1 * | 6/2015 | Haugen | G01M 3/24 73/152.47 |
| 2015/0192488 | A1 * | 7/2015 | Xu | B63G 8/001 348/81 |
| 2015/0314440 | A1 * | 11/2015 | Parker | B25J 9/1612 700/253 |
| 2015/0338253 | A1 * | 11/2015 | Kottapalli | G01F 1/28 73/861.74 |
| 2015/0350552 | A1 * | 12/2015 | Pryszo | H04N 23/695 348/143 |
| 2016/0063870 | A1 | 3/2016 | Scheidt | |
| 2016/0121983 | A1 * | 5/2016 | Rokkan | B63G 8/001 114/313 |
| 2016/0124105 | A1 * | 5/2016 | Valsvik | B63G 8/001 367/15 |
| 2016/0186534 | A1 * | 6/2016 | Schilling | E21B 41/04 166/351 |
| 2016/0200408 | A1 * | 7/2016 | Robertson | B63G 7/02 89/1.13 |
| 2017/0106537 | A1 * | 4/2017 | Chizeck | B25J 9/1689 |
| 2017/0160393 | A1 * | 6/2017 | Gatland | G01S 7/6281 |
| 2017/0195568 | A1 * | 7/2017 | Leizerovich, Jr. | G03B 37/04 |
| 2017/0210449 | A1 * | 7/2017 | Frisbie | B63B 49/00 |
| 2017/0220879 | A1 * | 8/2017 | Nakamura | H04N 23/61 |
| 2017/0233043 | A1 * | 8/2017 | Thorson | B63B 32/70 441/135 |
| 2017/0323154 | A1 * | 11/2017 | Kollmann | G06V 20/59 |
| 2017/0329037 | A1 * | 11/2017 | Zhou | G01V 5/0083 |
| 2017/0360016 | A1 * | 12/2017 | Saue | A01K 79/02 |
| 2017/0365175 | A1 * | 12/2017 | Harnett | B63H 20/14 |
| 2018/0043978 | A1 * | 2/2018 | Fang | B63G 8/42 |
| 2018/0074174 | A1 * | 3/2018 | Beer | B63G 9/02 |
| 2018/0107210 | A1 * | 4/2018 | Harnett | G01S 15/96 |
| 2018/0194446 | A1 * | 7/2018 | Frühling | B63H 25/42 |
| 2018/0252065 | A1 * | 9/2018 | Hemphill | H04B 1/745 |
| 2019/0155310 | A1 * | 5/2019 | Kim | G05D 1/048 |
| 2019/0174149 | A1 * | 6/2019 | Zhang | H04N 21/2187 |
| 2019/0202537 | A1 * | 7/2019 | Easterling | B63C 11/26 |
| 2019/0219692 | A1 * | 7/2019 | DePasqua | G01S 7/52004 |
| 2020/0049849 | A1 * | 2/2020 | Hartland | G01V 1/3852 |
| 2020/0231261 | A1 * | 7/2020 | Hartland | G01V 1/3843 |
| 2021/0086884 | A1 * | 3/2021 | Jongsma | H04N 23/51 |
| 2021/0302966 | A1 * | 9/2021 | Zhang | G05D 1/0206 |

* cited by examiner

SYSTEMS AND METHODS OF PILOT ASSIST FOR SUBSEA VEHICLES

CROSS REFERENCE PARAGRAPH

This application claims the benefit of U.S. Provisional Application No. 62/593,299, entitled "SYSTEMS AND METHODS OF PILOT ASSIST FOR SUBSEA VEHICLES," filed Dec. 1, 2017, the disclosure of which is hereby incorporated herein by reference.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Subsea operations in offshore oilfields are often performed with the assistance of unmanned submersible vehicles. These vehicles can be remotely controlled via a tether (remotely operated vehicles or ROVs) or wireless (untethered ROVs or uROVs). The untethered vehicles may also be at least partially autonomous (autonomous underwater vehicles or AUVs). Especially in the latter case, the bandwidth of the communications link can vary over a wide range depending on the transmission medium. For example, high bitrate connectivity can be realized when the vehicle is physically tethered via a cable to the surface equipment. However, such cables can restrict the movement of the vehicle. Untethered, autonomous underwater vehicles (uAUVs) are thus implemented, in which wireless communication is employed; however, the communication rate is generally much lower and may be interrupted intermittently, as transmission through water may be more difficult than, for example, transmission through the air, as with a flying vehicle.

Further, subsea operations are subjected to vehicle and platform motion, limited visibility for various different types of sensors, noise, cluttered environment, and significant uncertainty. Regardless of sensing modality—optical in the visible frequency range, infrared, LIDAR, Sonar—there are physical limits on range, resolution, and noise tolerance.

SUMMARY

Embodiments of the disclosure provide systems and methods that use hardware, software, and algorithms that leverage machine learning to assist in ROV/AUV operations. The system and method is capable of tracking objects based on a combination of operator input and prior information, and perform the appropriate level of control. This system and method may be a highly-interactive operator assistance system for subsea ROV/AUV missions. This system may be designed to take advantage of the autonomous capabilities of a subsea robot-mounted with multiple sensors. Further, the operator may be able to interact with subsea environment through live stream feed (e.g., video) directly and focus on surgical manipulation instead of piloting the sub sea robot.

Embodiments may provide a multi-modal approach to piloting a subsea robot, e.g., the perspectives, augmented view, smart filters, continuous anomaly detection mode, lock on target, exploration modes, environment build out, and abort path planning.

Embodiments may be implemented as part of an ROV/AUV/uROV deployment, including of at least one subsea vehicle, and a surface system. As the operator may have access to the deployment system through this surface system, the terms "surface system" and "operator's system" may be used interchangeably.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes,"

"including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Figure 1:
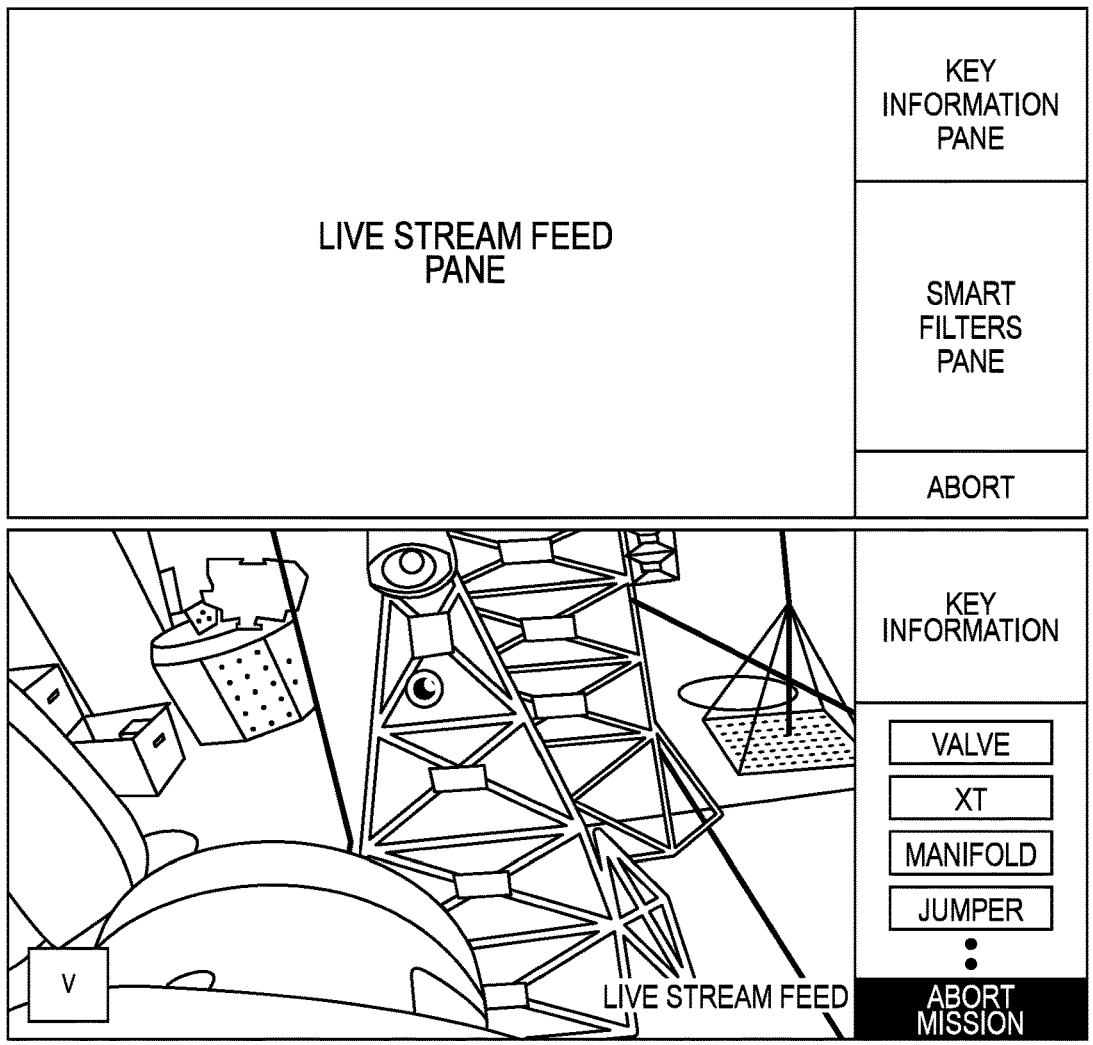
FIG. 1 illustrates a graphical user interface for a system and method to assist in controlling an underwater vehicle, according to an embodiment.
Figure 2:
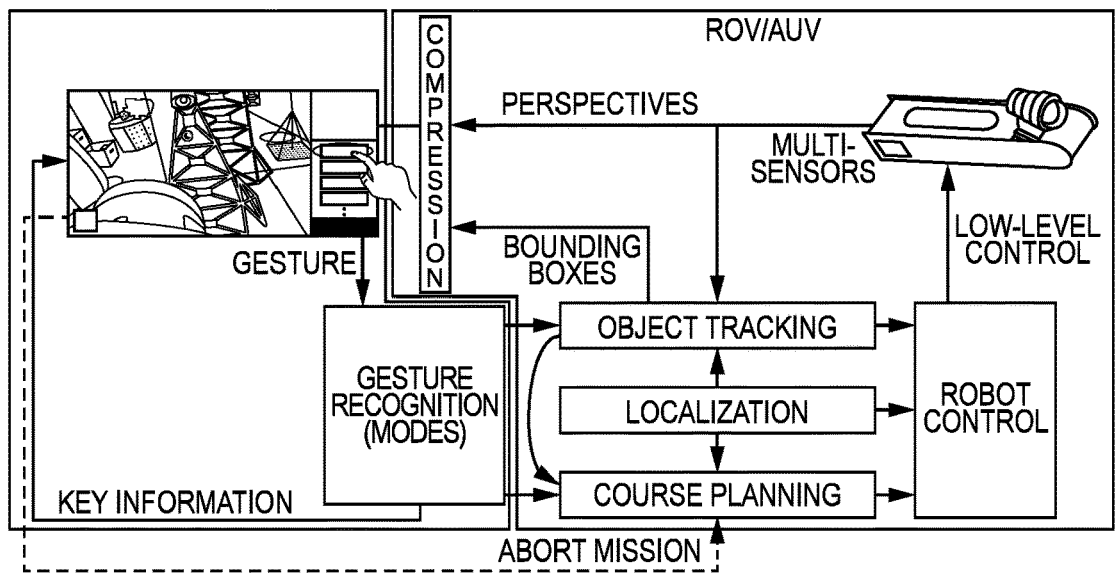
FIG. 2 illustrates a schematic view of a system to assist in controlling an underwater vehicle, according to an embodiment.

FIG. 1 illustrates graphical user interface for interacting with a user as part of the present system and method. As shown, the interface is subdivided into three main frames: the livestream frame, the information pane, and the smart filters pane. The frames link with multiple innovative modes for subsea submarine navigation; the modes are described in greater detail below. An overview of an example system architecture is shown in FIG. 2.

The system may have several components or combinations thereof, such as the following:

An operator display.
An operator input system.
Software/hardware on the surface system that tracks objects.
Software/hardware on the surface that continuously runs to detect anomalies from sensor data.
Software/hardware on the surface system that controls the vehicle at various levels, including but not limited to autonomy, path/course planning, sensors, control of vehicle parts (thrusters, fins, actuators, etc.).
Software/hardware on the subsea vehicle that tracks objects from live sensor data.
Software/hardware on the subsea vehicle that continuously runs to detect anomalies from live sensor data.
Software/hardware on the subsea vehicle that controls the vehicle at various levels, including but not limited to autonomy, path/course planning, sensors, control of vehicle parts (thrusters, fins, actuators, etc.).
A wired or wireless communications system on the subsea vehicle, which can be either optical, or acoustic, or electromagnetic (EMAG).

The operator may be located at the "surface" (e.g., on a platform or vessel on or near the ocean's surface) and therefore a system or sub-system said to be located at the surface can be co-located with the operator, and vice versa. One such embodiment may include On the operator side: A display system, an input system, software/hardware that tracks objects or detects anomalies from live sensor data, software/hardware that handles high-level control of the vehicle, and part of a wireless communications system.
On the vehicle: A part of a wireless communications system, software/hardware that handles low-level control of the vehicle.

Instances of the sub-systems can be made redundant between the surface system and the vehicle to provide reliability in case of failure or outage of one of the sub-systems. Furthermore, during operation, the proposed system may switch its operating mode in the sense that it re-distributes its tasks among the sub-systems. For example, during communication outage, the on-board sub-systems on the vehicle may take over tasks that were executed by the surface system.

Figure 3:
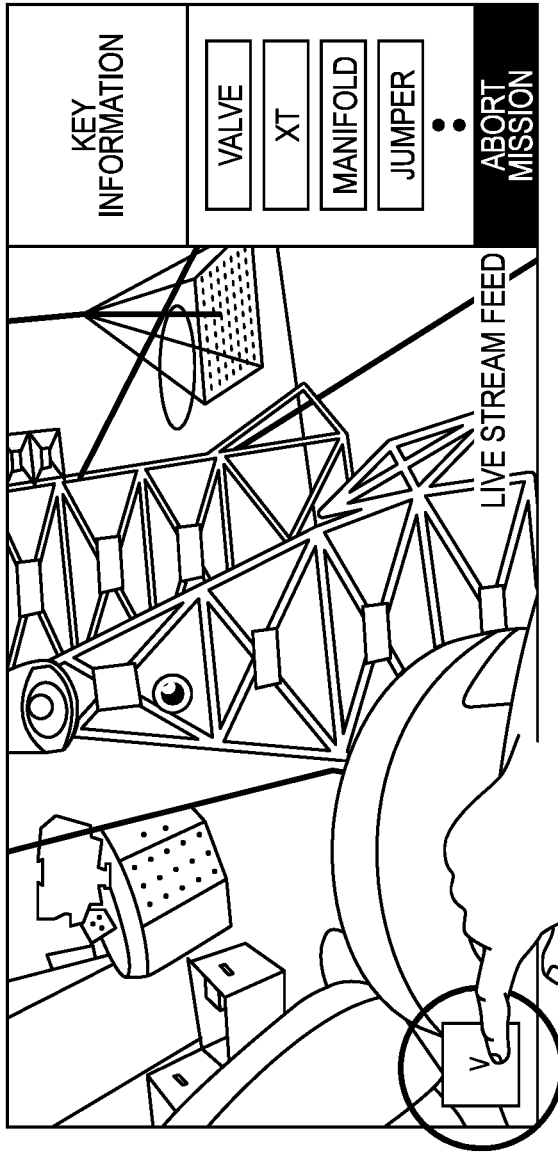
FIGS. 3, 4, 5, 6, 7, 8, and 9 illustrate views of example user interactions with the graphical user interface, according to an embodiment.

Perspectives mode: Switch between sensors (RGB/Lidar/Depth . . . ) and refresh the live stream view accordingly. See FIG. 3.

Figure 4:
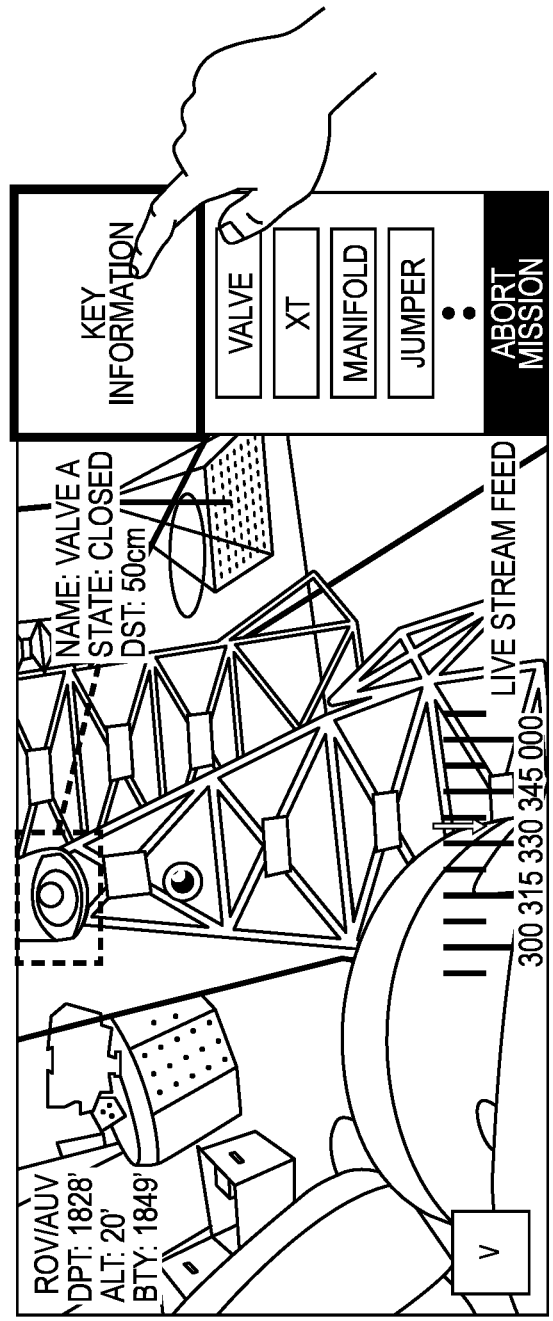

Augmented view mode: Operator presses on the key information pane which may augment the live stream view with meaningful information that can be generic, such as ROV/AUV DPT, ALT, BTY, compass. The information can also be more specific information based on the other key selection from the interface (e.g., if smart filter is selected then augment the highlighted object with information relative to it such as distance to object state of object, name of object). See FIG. 4.

Figure 5:
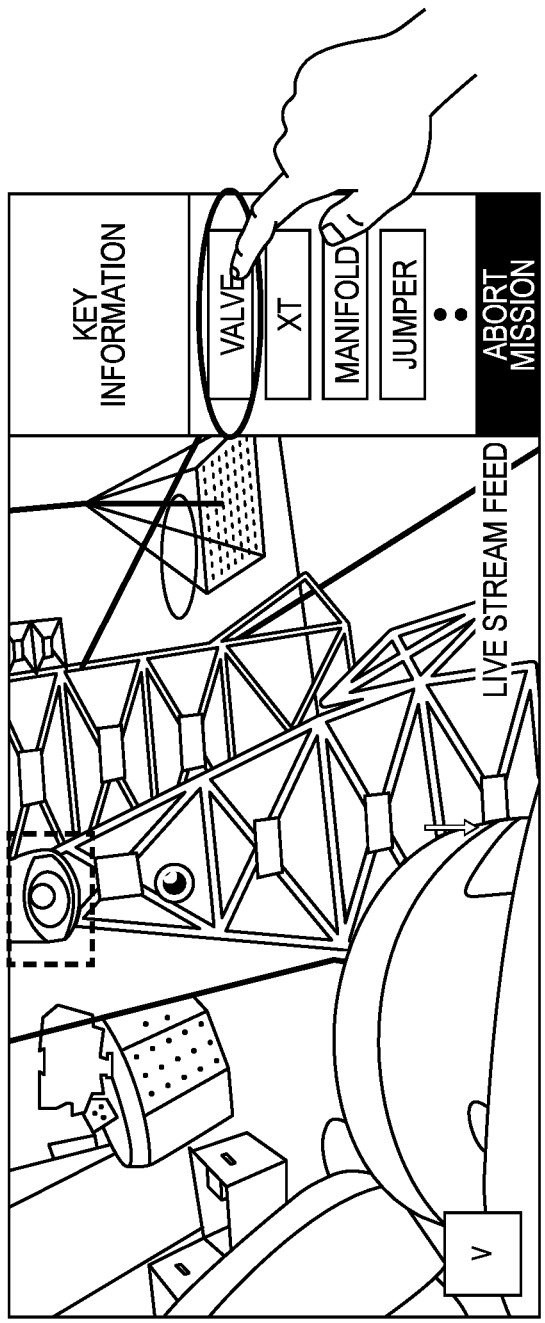
Figure 6:
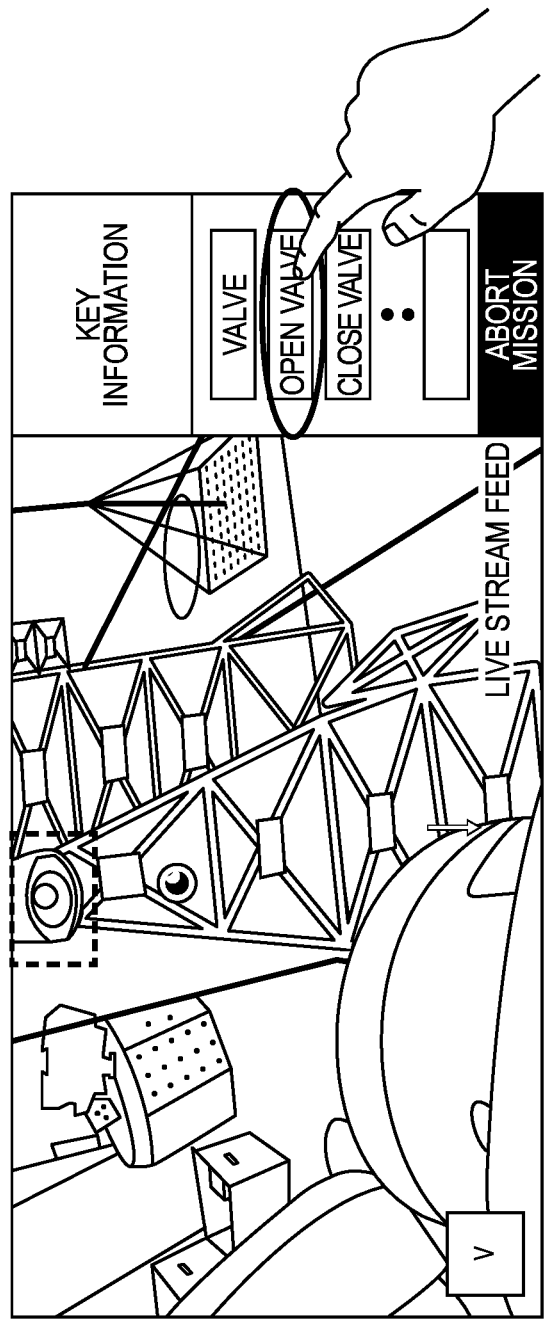

Smart filters/actions mode: As part of the surface system at the operator's console, this sub-system uses backend machine learning to show/highlight dynamically elements of interest—See FIG. 5. Smart Filters can also guide compression algorithms to selectively compress the areas that are out of the smart filter scope and keep at high resolution the smartly highlighted features from within the live sensor stream. Once a smart filter mode is selected, the user can then receive a list of actions related and specific to that smart filter (see FIG. 6). Once selected, these actions may trigger the appropriate robot control from FIG. 2 and trigger the selective compression in the data flow. Note that the smart filter mode can also be run on the marine vehicle itself and remotely operated from the operator's console.

Example Interaction:

Operator selects filter(s)—elements of list can either be dynamically generated to keep operator aware of surroundings or pre-defined based on operation.

In response, the backend highlights feature on live stream feed and updates the information panel with potential information of interest (name, state). Further, the system may employ semantic segmentation using deep learning. The backend may also selectively compress live stream with quality emphasis to keep selected element(s), e.g., based on available bandwidth. Further, the system may employ selective compression foreground/background (e.g., video compression with x264).

Continuous Anomaly detection mode: As part of the surface system at the operator's console, this sub-system uses backend machine learning to continuously show/highlight dynamic elements from within the sensed data that are considered as anomalies. The anomalies are then shown to the user on the livestream with a specific pattern based on the anomaly severity. Note that the process may run continuously in the background in parallel to other modes and may have a high (or highest) priority relative to other modes, e.g., except for the Abort path planning mode. Also, for redundancy, the sub-system can run on the vehicle onboard computing platform side as well.

Example of interaction:

Operator is using the surface system going through different modes. One of the sensors in the livestream view shows something that the continuous anomaly detection algorithm thinks is of high severity. The operator is then automatically alerted on the interface and the anomaly is then highlighted and overlaid on the video livestream with a color that is unique and proportional to the severity of the anomaly.

The system may employ classification/detection using machine learning. For example, a neural network is trained with a series of issues that were labelled by expert users. Once trained the network can then be used and continuously run in the background in inference to detect anomalies from live sensor feed. The output is then simply color coded and overlaid using alpha blending on the current live sensor streams.

Environment build-out (vehicle memory): use machine learning to identify other objects, classify them, overlay a spatial target with exclusion zones or defined interactivity. Can be updated constantly with updated live stream of set as memory (if always static).

Figure 7:
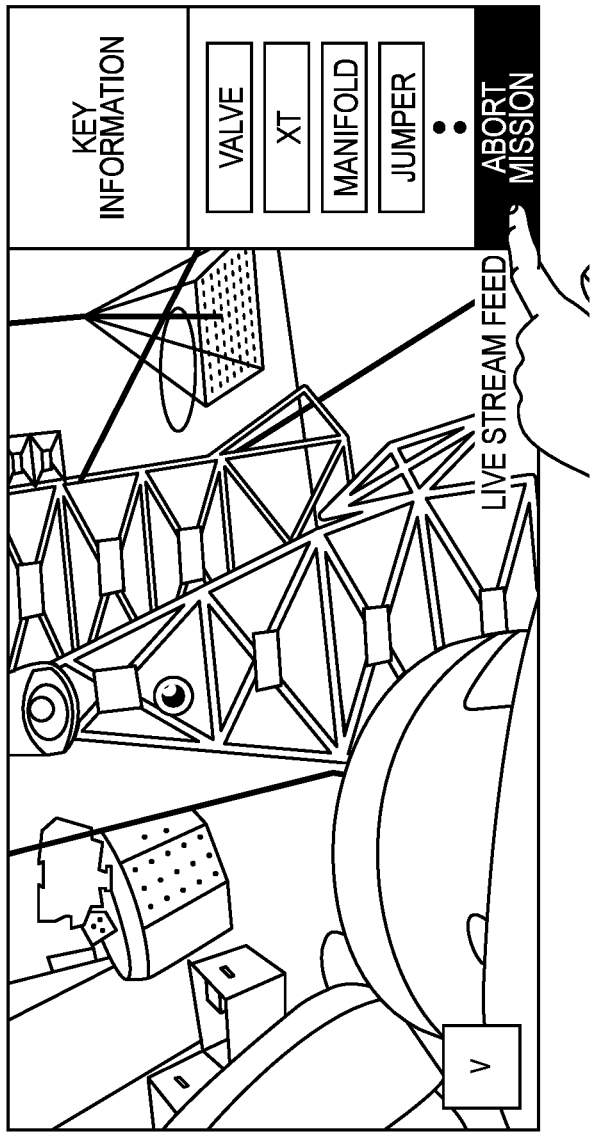

Abort path planning: use smart filters and environment build out inputs to create abort pathway command that can be triggered by operator with single command ("big red button") or faults/dead man switch or communication scenarios. Using spatial awareness operator can choose actions and path before engaging in critical operations. See FIG. 7.

Lock on target mode: Enforce the robot to keep selected area in focus by adjusting robot and keeping it inline with the selected area. See FIG. 8.

Figure 8:
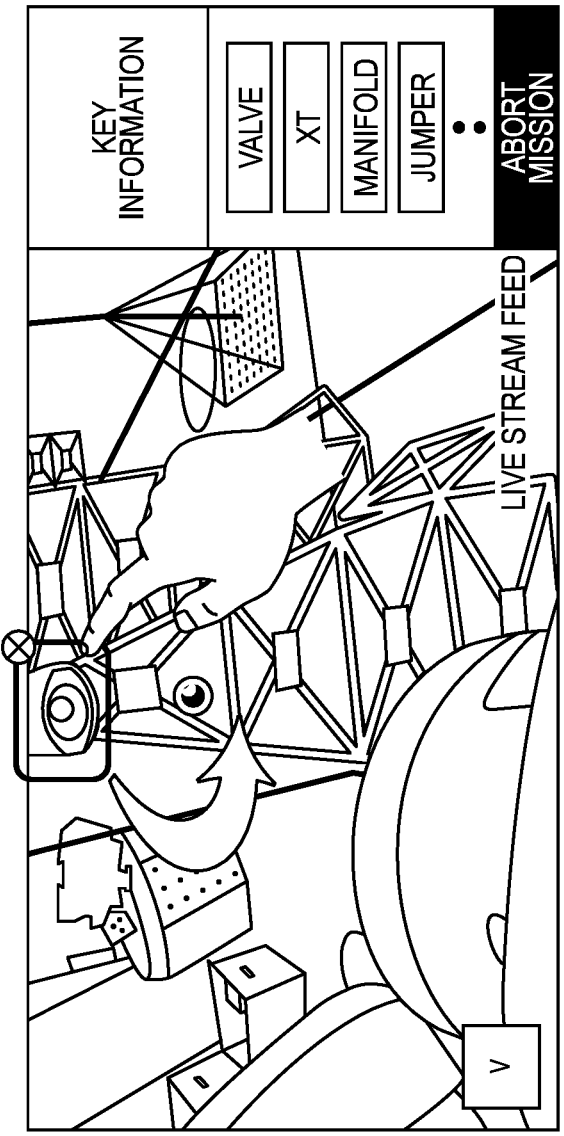

Example Interaction:
1—Operator draws around the area(s) of interest
In response, the vehicle may be instructed to move such that the target is in focus and aligned with middle of live stream feed (illustrated in FIG. 8 by the arrow).

Accordingly, the processor may use computer vision to adjust robot location based on location of selected object relative to total frame, and estimate movement to move the object around the center of the frame and keep the object in focus. Thrusters may be positioned accordingly, while keeping the vehicle in line with centroid of the selected box, for example.

2—Operator selects cross to stop lock on process. In response, the vehicle may stay in hover mode at a position, such as its last known position.

Figure 9:
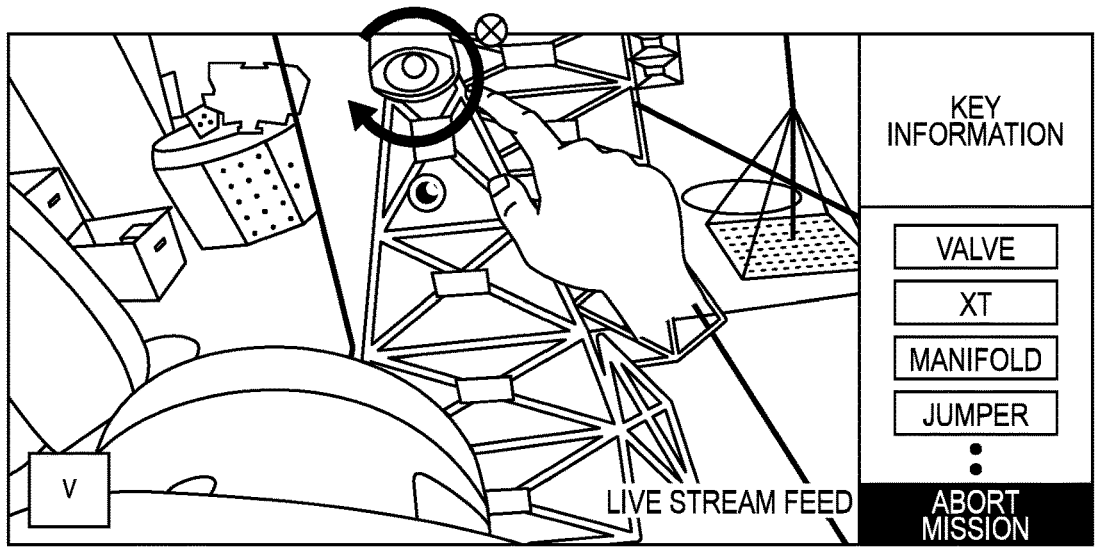

Exploration mode: Instruct robot to do a limited exploration around the object of interest. While and object of interest is being tracked (locked on), the user can activate the Orbit exploration mode. The robot will then rotate around the object of interest autonomously with certain angle. There may be two (or potentially more) exploration modes: Orbit, Panorama. See FIG. 9 for Orbit mode.

The orbit mode may be used, e.g., when an operator has a single main object of interest e.g. a Christmas tree or an interesting artifact, but is unsure about the viewing angle for the inspection of the structure in the context of Subsea IMR. Under the Orbit mode, the vehicle may hover and move in a full/half circle, or at a defined angle, about the object, while looking inward with its sensors at the structure in the center. When in Pano mode, the sensors look outwards instead of inward. The sensors stay at a fixed location while panning horizontally, e.g., for full 360 degrees or a user-defined angle. This mode is well suited for panoramic shots. The Orbit and Pano modes pan the camera, but may fix its tilt.

Example Interaction (Orbit Mode):
1—Operator draws circle shape around the area of interest—can be clockwise or counterclockwise
In response, vehicle may be instructed to orbit to the right or left around the object of interest while maintaining a predetermined distance from it based on the last 6DOF state of the vehicle.

The system may use an RGB-D aligned point cloud to estimate selected object centroid by taking for example an average over all 3D depth points. A simple rotational movement may then be planned and carried out by adjusting vehicle position while keeping vehicle in line with the centroid.

2—Operator selects cross to stop exploration process—vehicle stays in hover mode at last known position.

Example Interaction (Pano Mode):
1—Operator draws a straight-line shape around the area of interest—can be to the left or to the right. In response, the submarine is instructed to conduct a panoramic movement to the right or left, while keeping a predetermined distance from the object based on the last 6DOF state of the robot.
2—Operator selects cross to stop exploration process—robot stays in hover mode at last known position.

Operation of System

The system may include several subsystems that may interact to effect the function of the system, e.g., according to user input via the interface discussed above. The subsystems may include one or a combination of the following:
Subsystem 1: An operator display.
Subsystem 2: An operator input system.
Subsystem 3-4: Software/hardware that tracks objects/detects anomalies.

The object tracking and anomaly detection sub-systems are typically approached, but not limited to, as a combination classification and regression problems where the algorithm learns the characteristics of the structures of interest (classes) using a set of labeled inputs. These characteristics are then subsequently used for automatically labelling live sensor input streams (e.g. live video, point cloud, sonar).

This labelled data can then be used for training and testing purposes to implement object detection or segmentation. Labelled data can come in the form of structures, anomalies, words.

Figure 10:
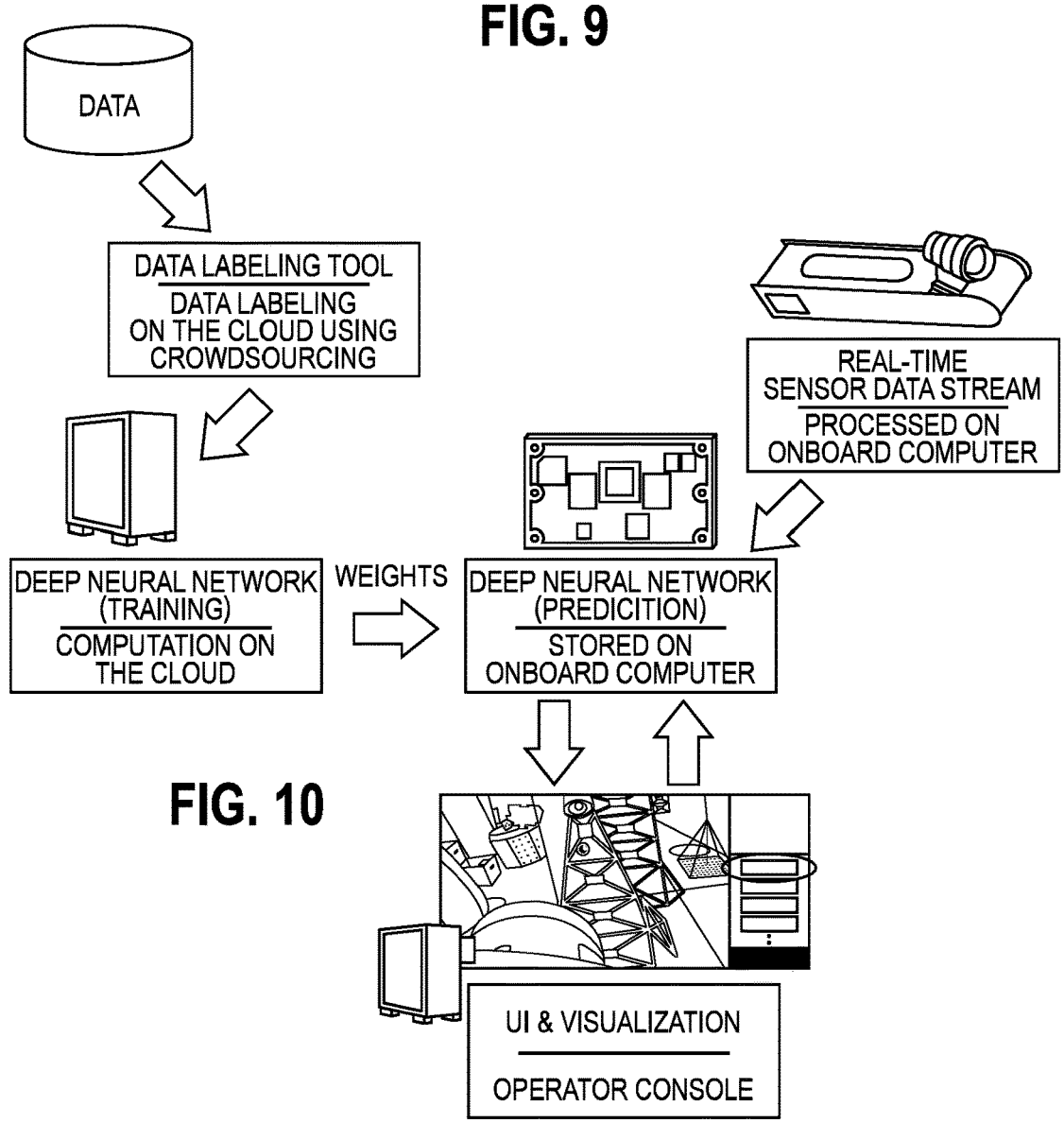
FIG. 10 illustrates a conceptual view of a system to assist in controlling an underwater vehicle, according to an embodiment.

This sub-system performs several tasks or combinations of:
Takes relevant input
Processes relevant input
Improves its own learning
Updates its process One possible architecture for the anomaly detection/object tracking is described in FIG. 10.

The system may also include a sub-system 5: Software/hardware that controls the vehicle at various levels, including but not limited to autonomy, path/course planning, sensors, control of vehicle parts (thrusters, fins, actuators, etc.). Vehicle controls include high-level tasks such as path-planning, mission control and execution; it can include low-level tasks such as thruster control, fin control. Those tasks can be distributed between the surface and on-board sub-systems, with task delineation changing depending on operational circumstance.

The system may further include a sub-system 6: A wired or wireless communications system on the subsea vehicle, which can be either optical, or acoustic, or based on electromagnetic principles. Such a sub-system can use redundancy, for example, it can send its data through several sub-channels in order to ensure reliable communication.

Figure 11:
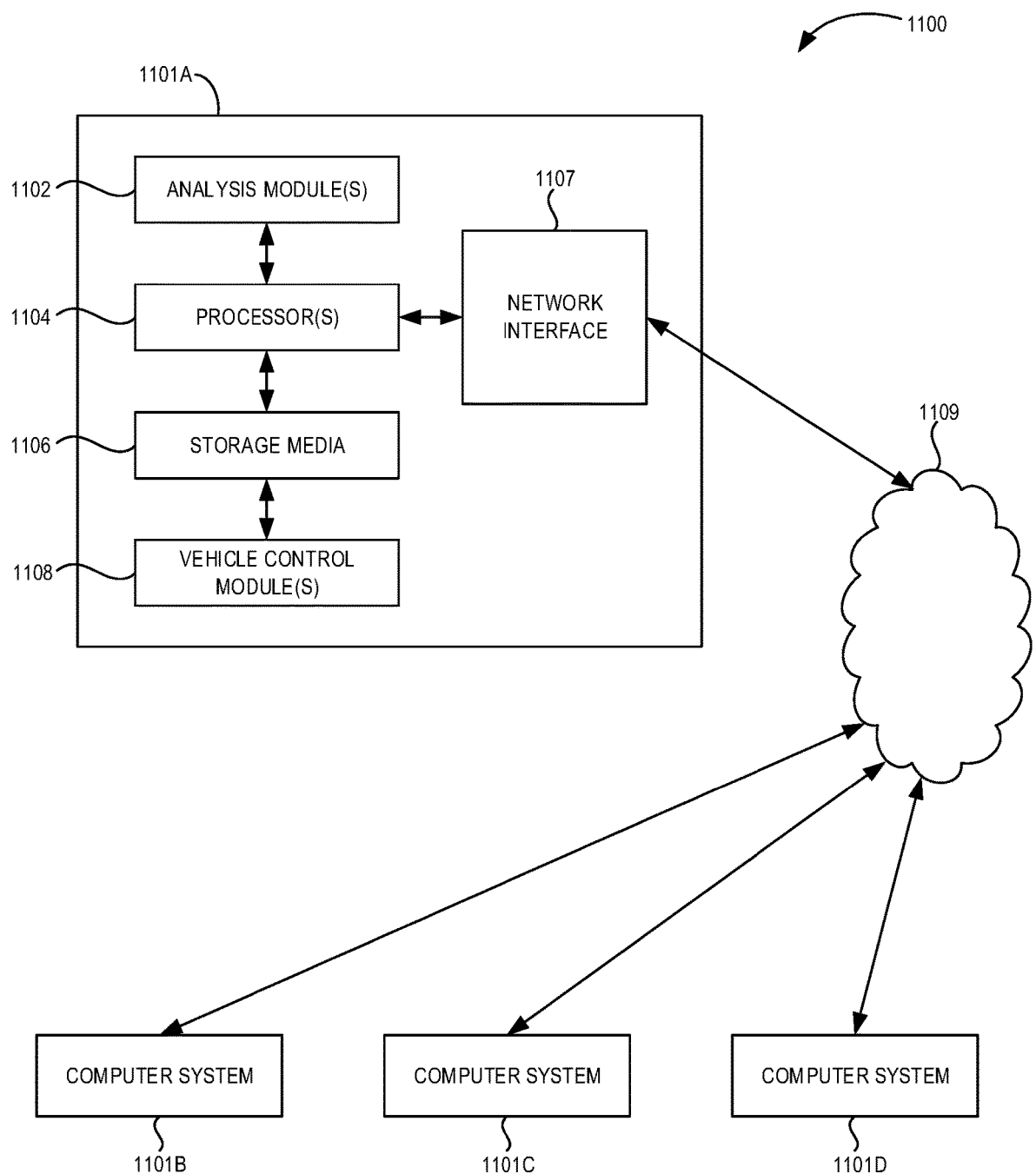
FIG. 11 illustrates a schematic view of a computer system, according to an embodiment.

In some embodiments, the methods of the present disclosure may be executed by a computing system, which may be located in the subsea vehicle, in the operator's subsystem (e.g., at the surface), or distributed redundantly at both. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis modules 1102 that are configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor may include a microprocessor, microcontroller, processor module or subsystem, programmable integrated circuit, programmable gate array, or another control or computing device.

The storage media 1106 may be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1100 contains one or more vehicle control module(s) 1108. In the example of computing system 1100, computer system 1101A includes the vehicle control module 1108. In some embodiments, a single vehicle control module 1108 may be used to perform some or all aspects of one or more embodiments of the methods disclosed herein. In alternate embodiments, a plurality of vehicle control modules 1108 may be used to perform some or all aspects of methods herein.

It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for controlling a subsea vehicle, comprising:
receiving sensor data representing a subsea environment from one or more sensors of the subsea vehicle;
determining one or more objects present in the subsea environment based on the sensor data using an artificial intelligence machine;
monitoring the sensor data for one or more anomalies;
determining a severity associated with the one or more anomalies;
displaying the one or more objects on a user interface;
receiving, via the user interface, an indication of a filter selection;
highlighting the one or more objects on the user interface based on the filter selection, wherein highlighting the one or more objects comprises overlaying an object on a video stream displayed on the user interface with a color, wherein the color is associated with the severity;
displaying information associated with the one or more objects on the user interface based on the filter selection;
receiving an input pertaining to a requested vehicle task associated with the one or more objects from the user interface, the input comprising a circle drawn around the one or more objects;
determining a centroid of the one or more objects using a color and depth (RGB-D) aligned point cloud; and
performing the requested vehicle task, wherein the requested vehicle task is selected from a predefined set of tasks that the subsea vehicle is configured to perform, the predefined set of tasks including orbiting by moving at a user-defined angle in a circular motion based on the input comprising the circle drawn around the one or more objects, such that the one or more sensors are fixed on the centroid of the one or more objects.

2. The method of claim 1, wherein the requested vehicle task is selected from the predefined set of tasks that the subsea vehicle is configured to perform, the predefined set of tasks including panning by conducting a panoramic movement horizontally at an additional user-defined angle and maintaining a predetermined distance from the one or more objects while the one or more sensors look outwards and remain at a fixed location.

3. The method of claim 1, further comprising transmitting information related to a status of the one or more objects to the user interface, wherein the user interface is configured to display the status of the one or more objects on the user interface.

4. The method of claim 1, further comprising:
receiving feedback on identification of the one or more objects; and
training the artificial intelligence machine based on the feedback.

5. The method of claim 1, further comprising:
planning an abort path from a position of the subsea vehicle; and
overriding vehicle tasks to cause the subsea vehicle to follow the abort path in response to determining a hazard is present or in response to receiving a user instruction.

6. A system, comprising:
a processor configured to display an interface, wherein the interface is configured to display a representation of a subsea environment; and
a subsea vehicle in wireless communication with the processor, wherein the subsea vehicle comprises:
one or more sensors configured to detect sensor data representing the subsea environment;
one or more additional processors configured to perform operations, the operations comprising:
determining one or more objects in the subsea environment based in part on the sensor data;
receiving an input pertaining to a vehicle task associated with the one or more objects from the interface, the input comprising a circle drawn around the one or more objects;
determining a centroid of the one or more objects using a color and depth (RGB-D) aligned point cloud;
monitoring the sensor data for one or more anomalies;
determining a severity associated with the one or more anomalies;
displaying the one or more objects on the interface;
receiving a filter selection from the processor;
highlighting, via the interface, the one or more objects based on the filter selection, wherein highlighting the one or more objects comprises overlaying the one or more objects on a video stream displayed on the interface with a color, wherein the color is associated with the severity;
receiving the vehicle task associated with the one or more objects from the processor; and
performing the vehicle task, wherein the vehicle task is selected from a predefined set of tasks that the subsea vehicle is configured to perform, the predefined set of tasks including orbiting by moving at a user-defined angle in a circular motion based on the input comprising the circle drawn around the one or more objects, such that the one or more sensors are fixed on the centroid of the one or more objects.

7. The system of claim 6, wherein the subsea vehicle is configured to continuously detect anomalies in the sensor data.

8. The system of claim 6, wherein the interface is configured to receive a selection of high-level vehicle tasks, and wherein the one or more additional processors of the subsea vehicle are configured to control low-level vehicle tasks so as to implement the high-level vehicle tasks.

9. The system of claim 6, wherein the one or more additional processors are configured to control the subsea vehicle in one or more modes of operation.

10. The system of claim 9, wherein the one or more modes of operation comprise a lock on target mode, an exploration mode, a pano mode, or a combination thereof.

11. A system, comprising:
a subsea vehicle configured to wirelessly communicate with a processor, wherein the subsea vehicle comprises:
one or more sensors configured to detect sensor data representing a subsea environment; and
one or more additional processors configured to perform operations, the operations comprising:
determining one or more objects in the subsea environment based in part on the sensor data;
determining a centroid of the one or more objects using a color and depth (RGB-D) aligned point cloud;
monitoring the sensor data for one or more anomalies;
determining a severity associated with the one or more anomalies;
displaying, via the processor, the one or more objects on a user interface;
receiving, via the processor, an indication of a filter selection;
highlighting the one or more objects based on the filter selection, wherein highlighting the one or more objects comprises overlaying an object on a video stream displayed on the user interface with a color, wherein the color is associated with the severity;
compressing at least a portion of the sensor data associated with one or more other objects that are outside of the scope of the filter selection;
receiving a vehicle task from the processor; and
performing the vehicle task, wherein the vehicle task comprises controlling the subsea vehicle in an orbit mode by moving the subsea vehicle at a user-defined angle such that the one or more sensors are fixed on the centroid of the one or more objects.

12. The system of claim 11, wherein the vehicle task comprises controlling the subsea vehicle in a lock on target mode, wherein in the lock on target mode the subsea vehicle is configured to autonomously adjust position to keep the subsea vehicle inline with a selected area to keep the selected area in focus.

13. The system of claim 11, wherein the vehicle task comprises controlling the subsea vehicle in an exploration mode, wherein in the exploration mode the subsea vehicle is configured to autonomously navigate about an area and/or an object of interest.

14. The system of claim 11, wherein the vehicle task comprises controlling the subsea vehicle in a pano mode, wherein in the pano mode the subsea vehicle is configured to autonomously move left and right at a predetermined distance from an area and/or object of interest.

15. The system of claim 11, wherein the subsea vehicle is configured to continuously detect anomalies in the sensor data.

16. The method of claim 1, wherein the information comprises a distance to the one or more objects or identification information relating to the one or more objects.

17. The system of claim 15, wherein the anomalies comprise one or more hazards.

18. The system of claim 17, wherein the one or more additional processors are configured to determine a severity of each of the one or more hazards, and highlight each of the one or more hazards with a color associated with the severity.

19. The method of claim 1, wherein the information comprises a name of the one or more objects.

20. The system of claim 14, wherein performing the vehicle task in the pano mode comprises receiving an input comprising a shape drawn via a user around the one or more objects.

* * * * *